United States Patent [19] [11] Patent Number: 5,065,576
Kanazawa et al. [45] Date of Patent: Nov. 19, 1991

[54] EXHAUST GAS PURIFYING DEVICE FOR A DIESEL ENGINE

[75] Inventors: Hirotaka Kanazawa; Yoshitomi Fujimoto; Michio Suzuki, all of Kariya, Japan

[73] Assignee: Kabushiki Kaisha Toyoda Jidoshokki Seisakusho, Aichi, Japan

[21] Appl. No.: 475,700

[22] Filed: Feb. 6, 1990

[30] Foreign Application Priority Data

Feb. 17, 1989 [JP] Japan .................. 1-18062[U]

[51] Int. Cl.⁵ .............................................. F01N 3/28
[52] U.S. Cl. .................................... 60/295; 60/299; 422/176; 422/180
[58] Field of Search ............... 60/299, 295; 422/176, 422/180

[56] References Cited

U.S. PATENT DOCUMENTS

| 3,644,098 | 2/1972 | De Palma | 60/295 |
| 3,719,457 | 3/1973 | Nagamatsu | 422/176 |
| 3,785,781 | 1/1974 | Hervert | 60/299 |
| 3,852,042 | 12/1974 | Wagner | 422/176 |
| 4,091,616 | 5/1978 | Loweg | 60/295 |
| 4,634,459 | 1/1987 | Pischinger | 422/176 |
| 4,797,263 | 1/1989 | Oza | 422/176 |

FOREIGN PATENT DOCUMENTS 61-286513 12/1986 Japan .

Primary Examiner—Douglas Hart
Attorney, Agent, or Firm—Burgess, Ryan & Wayne

[57] ABSTRACT

An exhaust gas purifying device for a diesel engine comprising an outer casing accommodating a catalyst-carrying honeycomb having a dustfree structure, and a baffle plate arranged in the outer casing of the device between an gas inlet of the case and the catalyst-carrying honeycomb. The honeycomb structure has open cells having a size equal to or less than 100 cells per square inch, to allow particles to pass therethrough. The baffle plate directs the exhaust gas over surface of the catalyst-carrying honeycomb, with a uniform distribution thereof.

6 Claims, 3 Drawing Sheets

EXHAUST GAS PURIFYING DEVICE FOR A DIESEL ENGINE

BACKGROUND OF THE INVENTION

1. Field of the Invention

The present invention relates to an exhaust gas purifying device for a diesel engine, and in particular, it relates to an exhaust gas purifying device by which the rate of purification of the exhaust gas is improved the an ability to provide a good maintenance is provided.

2. Description of the Related Arts

Catalysts are frequently used in known exhaust gas purifying devices used in an internal combustion engines to treat the exhaust gas before it is released to the atmosphere. One of these known exhaust gas purifying devices uses pellets to carry the catalyst, and the pellets are contained in a casing. For example, as shown in FIG. 5 of the attached drawings, a known exhaust gas purifying device comprises a double walled casing 2 with a centrally extending inner tube member 3 connected to an exhaust pipe 1, and catalyst-carrying pellets 4 are contained in the casing 2 outside of the inner tube member 3. The inner tube member 3 is provided with holes 6 to allow a flow of the exhaust gas from the engine through the exhaust pipe 1 and the inner tube member 3 into the area containing the catalyst-carrying pellets 4 in the casing 2, whereby toxic components in the exhaust gas, such as hydrocarbon and formaldehyde, are purified. During maintenance, the catalyst carrying pellets 4 are removed from the casing 2 through a filling opening sealed by a releasable plug 7, and the removed pellets 4 are heated in a furnace to burn away the deposited hydrocarbon and thus regenerate the pellets 4, which can be then refilled in the casing 2.

Other known exhaust gas purifying devices use a honeycomb structure to carry the catalyst, as shown in Japanese Patent Publication No. 61-286513. The honeycomb structure is formed from a porous ceramic filter and comprises a plurality of cells extending longitudinally of the honeycomb. In this prior art, one of the opposite ends of each cell is closed by a plug, and the closed end of one of the cells locates itself downstream of the flow of the exhaust gas and the closed end of an adjacent cell locates itself upstream thereof. Accordingly, the exhaust gas flows into one cell with a downstream cap, penetrates the intervening porous wall between the cells, and flows out from the adjacent cell, whereby the intervening porous walling gradually clogged with particulates in the exhaust gas. The clogged filter is regenerated by burning by a burner or an electric heater.

Nevertheless, several problems arise in the above described prior art devices. Namely, in the case of the exhaust gas purifying devices using catalyst-carrying pellets, the rate of purification of the toxic components is lowered because the particulates are deposited over the surfaces of the pellets. Preferably a large amount of pellets is provided, but this is difficult from the viewpoint of the available space in the automobile. Also, the deposited particles may corrode the exhaust gas purifying device, and further the maintenance of the catalyst-carrying pellets is difficult, in that the catalyst-carrying pellets must be regenerated by a heating treatment at a high temperature such as 700° C., and during this treatment, the pellets are often sintered, and thus permanently deteriorated.

In the case of the exhaust gas purifying devices using the catalyst-carrying honeycomb ceramic filter, a large amount of hydrocarbons is often deposited near the inlet end of the filter, and the burning treatment through the porous walls becomes difficult, and thus the maintenance thereof becomes difficult.

SUMMARY OF THE INVENTION

The object of the present invention is to provide an exhaust gas purifying device for a diesel engine by which the rate of purification is improved and the maintenance thereof is easily carried out.

According to the present invention, there is provided an exhaust gas purifying device for a diesel engine having an exhaust pipe connected therefrom, the device comprising an outer casing having a gas inlet adapted for connection to the exhaust pipe and a gas outlet, a catalyst-carrying honeycomb having a dustfree structure and arranged in the outer casing, and a baffle plate means arranged in the outer casing between the gas inlet and the catalyst-carrying honeycomb.

With this arrangement, the exhaust gas flows from the diesel engine through the exhaust pipe into the exhaust gas purifying device, wherein the exhaust gas is impeded by the baffle plate means and uniformly dispersed over the entire end surface of the catalyst-carrying honeycomb. The catalyst-carrying honeycomb has a dustfree structure, and thus comprises a plurality of cells extending longitudinally of the honeycomb, with the opposite ends of each of the cells opened. Accordingly, particles contained in the exhaust gas can pass through cells, a smaller deposit of particles on the inner walls of the cells. In the event that a large amount of the particles is deposited on the inner walls of the cells, it is possible to clean the catalyst-carrying honeycomb by blowing air or steam therethrough, for a short time, to remove the deposited particles and thereby prolong the life of the catalyst-carrying honeycomb. It is also possible to regenerate the catalyst-carrying honeycomb by burning the particles at a relatively low temperature.

BRIEF DESCRIPTION OF THE DRAWINGS

The present invention will more apparent from the following description of the preferred embodiment, with reference to the accompanying drawings, in which.

DESCRIPTION OF THE PREFERRED EMBODIMENTS

Figure 1:
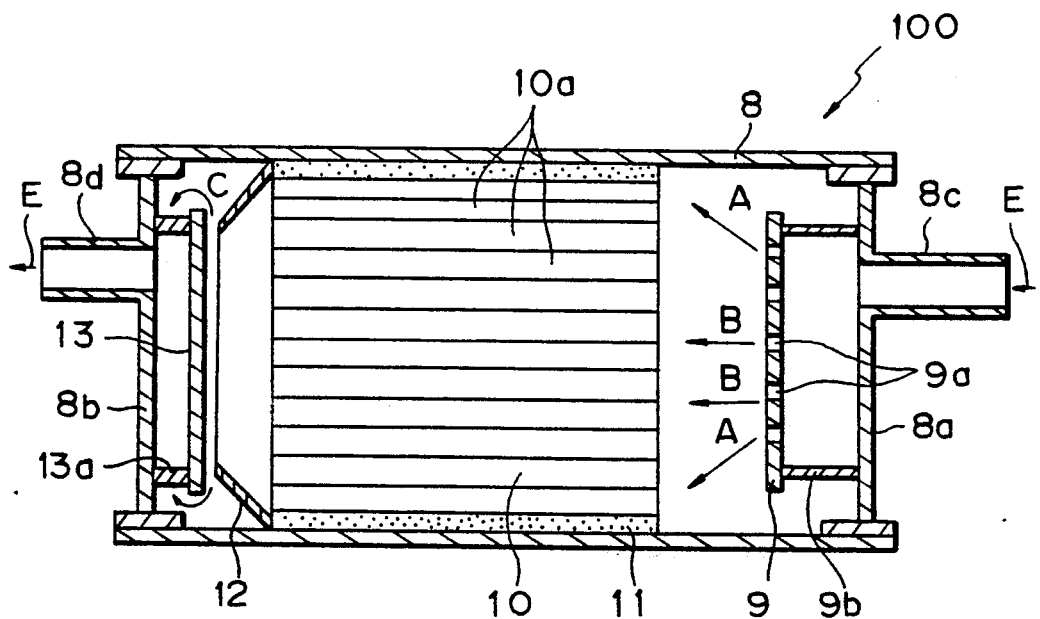
FIG. 1 is a cross sectional view of an exhaust gas purifying device according to the first preferred embodiment of the present invention.

As shown in FIG. 1, the exhaust gas purifying device 100 according to the present invention comprises an outer casing 8 in the form of a cylindrical member, and a first end cap 8a and a second end cap 8b attached to opposite ends of the cylindrical outer casing 8, respectively. Note, at least the first end cap 8a is detachably fixed to the cylindrical member 8 by bolts or the like (not shown). A gas inlet 8c is formed in the first end cap 8a and a gas outlet 8d is formed in the second end cap 8b, and the gas inlet 8c of the exhaust gas purifying device 100 is connected to the exhaust pipe (not shown) of a diesel engine, and the exhaust gas flows through the device 100 in the direction of the arrow E.

A first baffle plate 9 is attached to the first end cap 8a, a second baffle plate 13 is attached to the second end cap 8b, and a catalyst-carrying honeycomb 10 having a dustfree structure is arranged in the cylindrical outer casing 8 between the first baffle plate 9 and the second baffle plate 13.

The first baffle plate 9 is a flat disk having a cross-sectional area smaller than that of the catalyst-carrying honeycomb 10, and having a plurality of uniformly distributed apertures 9a having a diameter of 5 mm. The first baffle plate 9 is attached at the periphery thereof to the first end cap 8a, by an annular mounting member 9b, in alignment with the catalyst-carrying honeycomb 10, and thus the exhaust gas flowing from the diesel engine through the exhaust pipe and into the exhaust gas purifying device 100, is impeded by the first baffle plate 9a, flows through the apertures 9a, and is then dispersed uniformly over the entire end surface of the catalyst-carrying honeycomb 10, as represented by the arrows A and B. The arrow A indicates a portion of the exhaust gas flowing toward a peripheral region of the end surface of the catalyst-carrying honeycomb 10, and the arrow B indicates a portion of the exhaust gas flowing toward a central region of the end surface of the catalyst-carrying honeycomb 10. This total flow is averaged over the entire end surface of the catalyst carrying honeycomb 10, in comparison to a conventional exhaust gas purifying device in which the opposite ends of the outer casing are formed in a cone shape and a majority of the exhaust gas flows along the inner surface of the cone toward a peripheral region of the end surface of the catalyst-carrying honeycomb.

The catalyst-carrying honeycomb 10 has a dustfree structure, and thus comprises a plurality of cells 10a extending longitudinally of the honeycomb, wherein the opposite ends of each cell 10a are open. Accordingly, particles contained in the exhaust gas can pass through cells 10a, resulting in a lesser deposit of particles on the inner walls of the cells 10a. Typically, the catalyst-carrying honeycomb 10 is made from a porous cordierite having a size of 100 cells 10a per square inches (100 cells/inch$^2$), and a catalyst such as platinum is carried on the surfaces thereof. The catalyst-carrying honeycomb 10 is enclosed at the outer periphery thereof by an interlaminated mat 11 consisting of, for example, silica and alumina, and is a press fit in the cylindrical outer casing 8. The cylindrical outer casing 8 is thus spaced from the catalyst carrying honeycomb 10 via the interlaminated mat 11 and accordingly, is less affected, and corroded by, the salt sulfide generated by the catalyst. The catalyst-carrying honeycomb 10 is firmly supported in the cylindrical outer casing 8 during use by the thermally expanding interlaminated mat 11, and the interlaminated mat 11 is axially retained by a cone shaped retainer 12 having a divergent end thereof anchored to the cylindrical outer casing 8.

The second baffle plate 13 is a nonporous flat disk having a cross-sectional area generally equal to that of a converging end of the retainer 12. The second baffle plate 13 is attached to the second end cap 8b by four spaced leg members 13a, substantially in a relationship facing the converging end of the retainer 12. Therefore, the exhaust gas is impeded by the second baffle plate 13 and flows through a narrow gap between the second baffle plate 13 and the converging end of the retainer 12 to the gas outlet 8d, as represented by the arrow C. A back pressure is imposed on the exhaust gas, due to the provision of the second baffle plate 13, when the gas flows through the catalyst-carrying honeycomb 10, whereby the temperature of the exhaust gas rises within the catalyst carrying honeycomb 10, and thus the catalyst is made more active, whereby toxic components in the exhaust gas are converted to clean components during the reaction in the catalyst-carrying honeycomb 10.

When carrying out the maintenance of the catalyst carrying honeycomb 10 by regenerating same, it is possible to detach at least the first end cap 8a from the cylindrical outer case 8, and thus remove the catalyst-carrying honeycomb 10 from the cylindrical outer case 8. Then the catalyst-carrying honeycomb 10 can be cleaned by blowing air or steam therethrough and drying for a short time, to remove the deposited particles. It is also possible to heat the catalyst-carrying honeycomb 10 to turn away the deposited particles at a relatively low temperature of from 550° to 600° C., to thereby regenerate the catalyst-carrying honeycomb. Also, the exhaust gas purifying device 100 is less affected by corrosion, and thus the thickness of the wall of the cylindrical can be reduced and the total weight thereof lowered.

Figure 2:
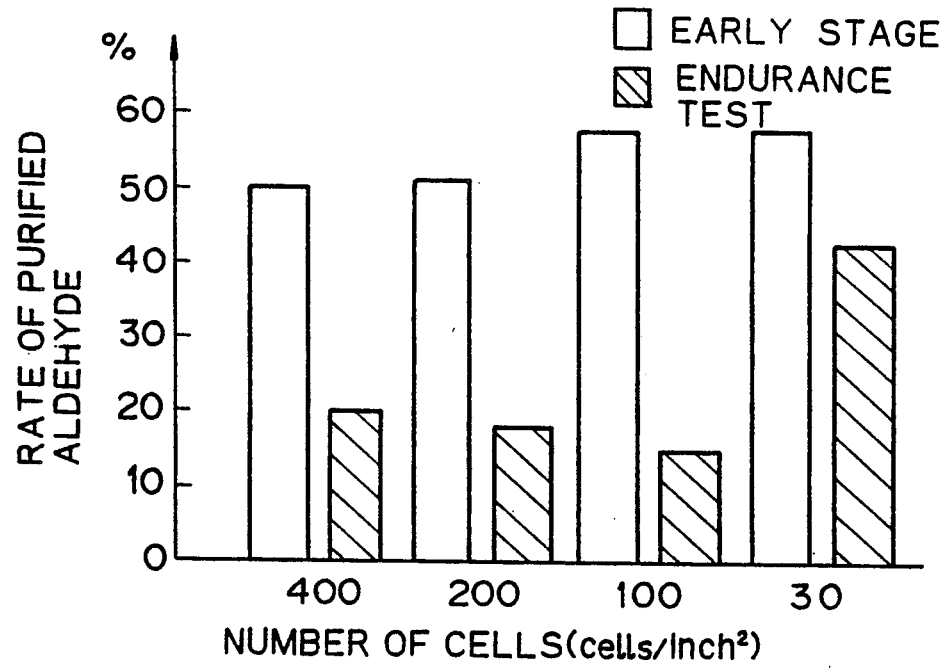
FIG. 2 is a graph of a rate of purified aldehyde during an endurance test of the exhaust gas purifying device of FIG. 1.

FIG. 2 is a graph of a rate of purified formaldehyde, i.e., a stimulative component in the exhaust gas, during an endurance test of the exhaust gas purifying device 100 of FIG. 1. In this example, 2 grammes per liter of platina were carried as the catalyst, and the space velocity was SV = 30,000 at 100° C.

Four samples of the catalyst-carrying honeycombs 10 were prepared, the first sample having a size of 400 cells 10a per square inch, the second having 200 cells 10a per square inch, the third having 100 cells 10a per square inch, and the fourth having 30 cells 10a per square inch. The endurance test was carried out by mounting the exhaust gas purifying device 100 including each of the samples of the catalyst-carrying honeycomb 10 to the diesel engine and starting the engine at 0° C. The measurement were carried out at an early stage of the operation of the engine and after an endurance test of 200 hours continuous operation of the engine. The estimation of the rate of purified formaldehyde was made by the DNDH method using a DNDH reagent.

As apparent from FIG. 2, the rate of purified formaldehyde is high during the early stage of the operation of the engine, for all samples, because less diesel particulates are deposited on the respective catalyst-carrying honeycomb 10 during this early stage, and the rate of purified formaldehyde decreases after the endurance test for each sample but is maintained at a relatively higher level in samples with larger cells 40a (number of cells 10a is less). This is because substantial clogging occurs in the cells 10a when the number thereof is greater than 100, to reduce the effective active surface, and further the geometric surface area becomes smaller with larger cells 10a (the geometric surface area of 30 cells/in$^2$ is a half of that of 100 cells/in$^2$) whereby the amount of platina carried per unit surface area is increased. In this regard, preferably the catalyst-carrying honeycomb 10 comprises a honeycomb structure having open cells 10a having a size equal to or less than 100 cells per square inch. In contrast, in the case of a gasoline engine, the honeycomb structure 10 may have partly closed cells having a size of more than 300 cells per square inch.

Figure 3:
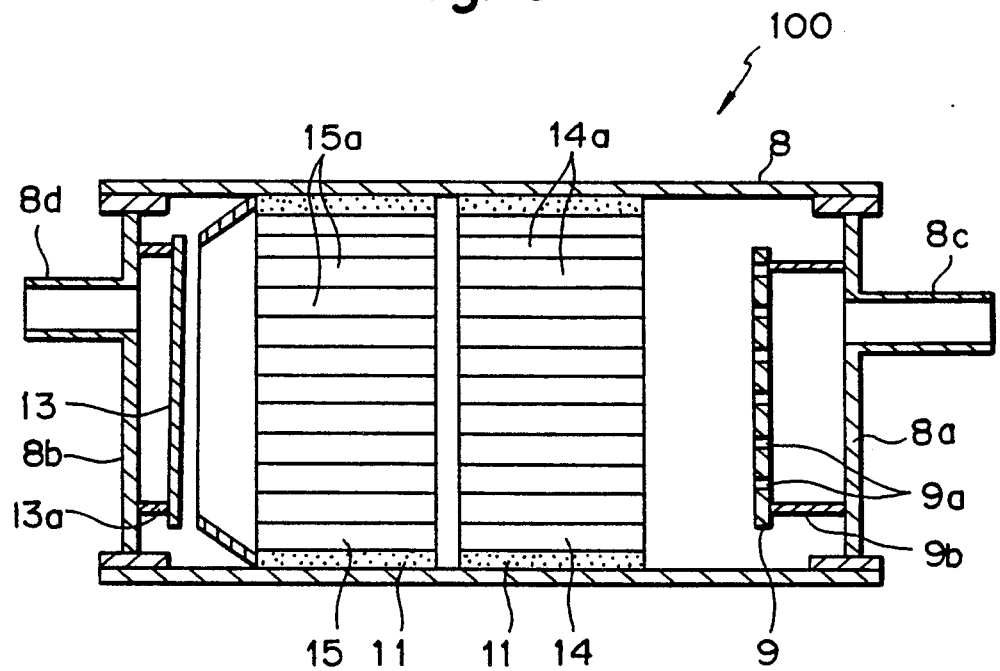
FIG. 3 is a cross sectional view of an exhaust gas purifying device according to the second preferred embodiment of the present invention.

FIG. 3 is a cross sectional view of an exhaust gas purifying device according to the second preferred embodiment of the present invention. This embodiment comprises similar elements to those of the first embodiment and similar parts are given the same reference numerals. In this embodiment, two catalyst carrying honeycombs 14 and 15 are fitted in the cylindrical casing 8 in an axially spaced relationship. Each of these catalyst carrying honeycombs 14 and 15 has a dustfree structure, and thus comprises a plurality of cells 14a and 15a extending longitudinally of the respective honeycomb, wherein the opposite ends of each of the cells 14a and 15a are not closed. Note, the number of cells 14a is not equal to that of the cells 15a. Namely, the number of cells 14a of the upstream catalyst-carrying honeycombs 14 is 100 cells per square inch and the number of the cells 15a of the downstream catalyst-carrying honeycombs 15 is 30 cells per square inch.

Figure 4:
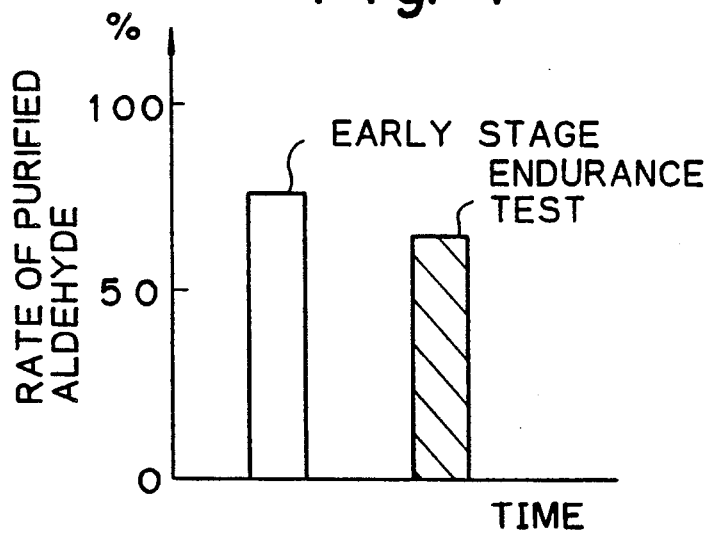
FIG. 4 is a graph of a rate of purified aldehyde during an endurance test of the exhaust gas purifying device of FIG. 3.
Figure 5:
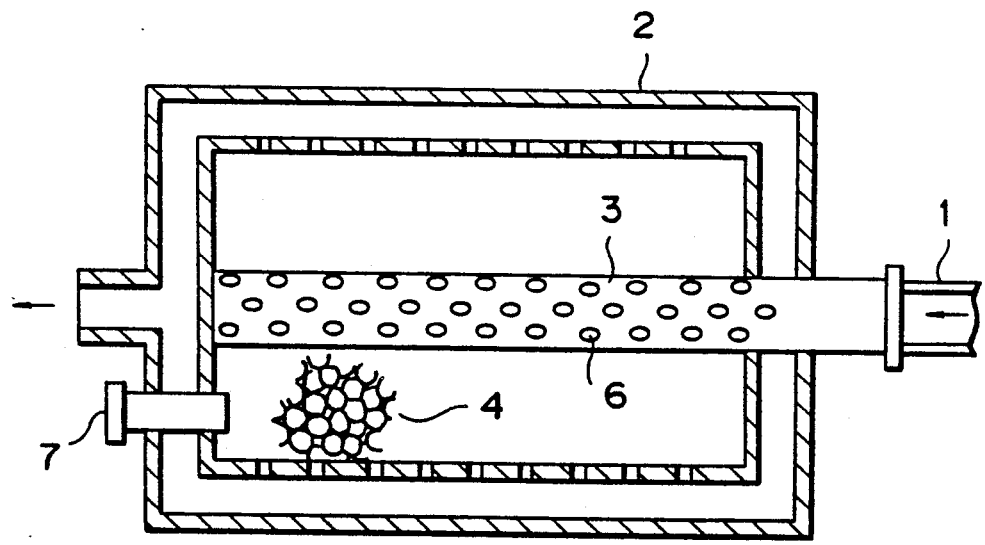
FIG. 5 is a cross sectional view of an exhaust gas purifying device of a prior art.

A test of the exhaust gas purifying device 100 of the second preferred embodiment, similarly to the above described test was carried out and the result is shown in FIG. 4, in which the rate of purified formaldehyde by the larger cells 14a and 15a is high during the early stage of the operation of the engine, and the rate of purified formaldehyde is maintained at a relatively higher level after the endurance test. It is considered that, after the endurance test, particles may be deposited on the upstream catalyst-carrying honeycombs 14 to some extent, and the deposited particles may grow, and this maintains the downstream catalyst-carrying honeycombs 15 in a clean condition, whereby the rate of the purified formaldehyde is not decreased and the exhaust gas purifying device 100 can maintain a high purifying ability.

In the preferred embodiment, the catalyst-carrying honeycombs 14 and 15 are made from a porous cordierite, but the catalyst-carrying honeycombs 14 and 15 can be made from other honeycomb structures, such as zeolite, sepiolite, silica-alumina, zirconia, titania, and corrugated metal.

As explained above, according to the present invention, the catalyst-carrying honeycomb has a dustfree structure, and thus is easily manufactured and incorporated in the outer casing. Maintenance can be easily carried out by washing in water and drying, and it is possible to observe the amount of particles deposited on the catalyst-carrying honeycomb.

What is claimed is:

1. An exhaust gas purifying device for a diesel engine having an exhaust pipe connected therefrom, said device comprising an outer casing comprising a cylindrical member, a first end cap closing one end of said cylindrical member and having a gas inlet formed therethrough adapted for connection to said exhaust pipe, and a second end cap closing the other end of said cylindrical member and having a gas outlet formed therethrough, a catalyst-carrying honeycomb having a dust free structure and arranged in said outer casing, and a baffle plate means arranged in said outer casing between said gas inlet and said catalyst-carrying honeycomb and attached to said first end cap, wherein at least one of said end caps is detachable from said cylindrical member and said catalyst-carrying honeycomb is removable from said outer casing after said end cap is detached.

2. An exhaust gas purifying device according to claim 1, wherein said catalyst-carrying honeycomb comprises a honeycomb structure having open cells having a size equal to or less than 100 cells per square inch.

3. An exhaust gas purifying device according to claim 1, wherein said baffle plate means comprises a flat baffle plate having apertures formed therethrough and attached to said first end cap by an annular mounting member, in alignment with said catalyst-carrying honeycomb, said flat baffle plate having a cross-sectional area smaller than that of said catalyst-carrying honeycomb.

4. An exhaust gas purifying device according to claim 1, wherein a second baffle plate means is attached to said second end cap by leg members and faces said catalyst-carrying honeycomb.

5. An exhaust gas purifying device according to claim 1, wherein a plurality of catalyst-carrying honeycombs are fitted in the outer casing in an axial spaced relationship, each of said catalyst-carrying honeycombs having a dustfree structure.

6. An exhaust gas purifying device according to claim 5, wherein two catalyst-carrying honeycombs are provided, and the number of the cells of the upstream catalyst-carrying honeycomb is greater than that of the downstream catalyst-carrying honeycomb.

* * * * *